FIG. 1.

Jan. 8, 1952 P. T. NIMS 2,581,596
POWER TRANSMISSION
Filed Jan. 26, 1946 4 Sheets-Sheet 2

INVENTOR.
PAUL T. NIMS.
BY
Harness and Harris
ATTORNEYS.

Fig. 3.

INVENTOR.
PAUL T. NIMS

Jan. 8, 1952          P. T. NIMS          2,581,596

POWER TRANSMISSION

Filed Jan. 26, 1946          4 Sheets-Sheet 4

INVENTOR.
PAUL T. NIMS
BY
Harness and Harris
ATTORNEYS.

Patented Jan. 8, 1952

2,581,596

UNITED STATES PATENT OFFICE 2,581,596

POWER TRANSMISSION

Paul T. Nims, Detroit, Mich., assignor to Chrysler Corporation, Highland Park, Mich., a corporation of Delaware Application January 26, 1946, Serial No. 643,803

35 Claims. (Cl. 180—65)

This invention is directed generally toward mechanism for coupling a high speed light weight low torque prime mover for driving a relatively slow speed high torque load and which has utility among other uses for permitting an automobile to be driven by a gas turbine.

One of the objects of this invention is to provide a suitable mechanism for driving a motor vehicle by a gas turbine.

Another object is to provide a transmission unit having an infinite number of drive ratios between the prime mover and driven part.

Another object is to provide such a mechanism which is automatic in operation and not dependent upon the operator for adjustment.

Another object is to provide an electrically operated mechanism for driving the load from the prime mover.

Another object is to provide in such an electrically operated mechanism electrical braking means for the motor vehicle.

These and further objects will be apparent by a reading of the specification and appended claims.

The invention consists in the improved construction of and combination of parts, the novel features of which will be distinctly pointed out in the accompanying specification and appended claims.

Figure 2:
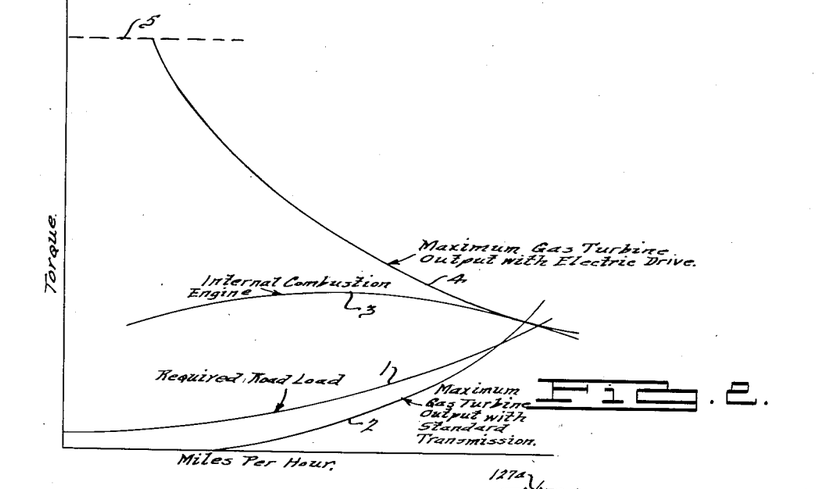
Fig. 2 is a graphic illustration of certain speed torque relationships.

A reciprocating gasoline engine and the internal combustion or gas turbine have entirely different operating characteristics, the gas engine having essentially a constant torque output with respect to speed of its rotation while the torque output of the turbine increases with its speed. The gas turbine therefore, if it is to be used in place of the reciprocating engine, must be connected to drive the vehicle in an entirely different manner than that used for driving with the reciprocating engine. For purposes of illustration, curve 1 of Fig. 2 shows a typical set of torque versus road speed curves showing the torque required to drive a motor vehicle at various road speeds. Curve 2 shows the torque which would be supplied by a gas turbine to the vehicle wheels using a fixed constant gear reduction between the turbine and wheels. It will be evident that at speeds below the intersection of curves 1 and 2 the turbine cannot supply the required torque to keep the vehicle in operation while at speeds above said speed the turbine will supply an increasing excess torque. By changing the gear ratio between the turbine and wheels the point of intersection could be made to occur at any desired vehicle speed but the general shape of the curve would remain the same. It may, therefore, be seen that at one point only will the turbine output be matched with the required load. But as may be seen by the relative form of the curves, it is a condition of instability with a slight change in vehicle speed resulting either in the vehicle stalling or running away. This situation is to be contrasted with the relationship of the required road load torque curve 1 and the output torque curve 3 of the usual internal combustion engine. It will be noted by comparing curve 1 with curve 3 that at low road speeds the reciprocating engine is operable to supply driving torque in excess of that required by the vehicle which excess may be made use of for acceleration or hill climbing. The maximum speed of the vehicle is limited to the speed corresponding to that at the point of intersection of curves 1 and 3. The internal combustion engine characteristics, curve 3, and road load requirements, curve 1, therefore cooperate together to provide a stable operating condition as contrasted to the unstable condition represented by the turbine curve 2 and the load curve 1.

It may, therefore, now be seen that before the gas turbine may be used to drive a motor vehicle satisfactorily, a drive must be furnished whereby the torque applied to drive the vehicle must always equal the torque required by the vehicle for constant speed operation and have excess torque and power available for acceleration. This could be accomplished by providing a large number of gear ratios between the turbine and wheels so that as the vehicle speed changes the torque supplied by the turbine would always be equal to that required by the vehicle. The amount of gearing to accomplish this would be tremendous, uneconomical and, unless automatically done, unsatisfactory. The driver would be continually changing ratios to maintain the turbine output torque exactly at that required to drive the vehicle to prevent stalling or excess speed. This condition would not be condoned by the vehicle driver. With my electric drive interposed between the gas turbine and the vehicle drive, I am able to deliver torque in accordance with the form of curve 4 of Fig. 2. It will be evident to those skilled in the art that, dependent upon the rate at which fuel is supplied, a family of curves similar to curve 4 would result and by adjusting the fuel rate to agree with, for example, curve 4, the vehicle would operate at the speed and torque corresponding to the point where the curves 1 and 4 intersect. Should the vehicle speed decrease for any reason the turbine would exert a greater torque and return the speed to the equilibrium speed. Conversely, if the vehicle speed should exceed the equilibrium speed, the turbine torque would be too small to maintain the excess speed and the vehicle would slow down to the equilibrium speed. Torque applied in this manner by the turbine brings the combination into a stable relationship. Curve 5 represents the torque at which the vehicle wheels will slip and which should not be exceeded.

Figure 1:
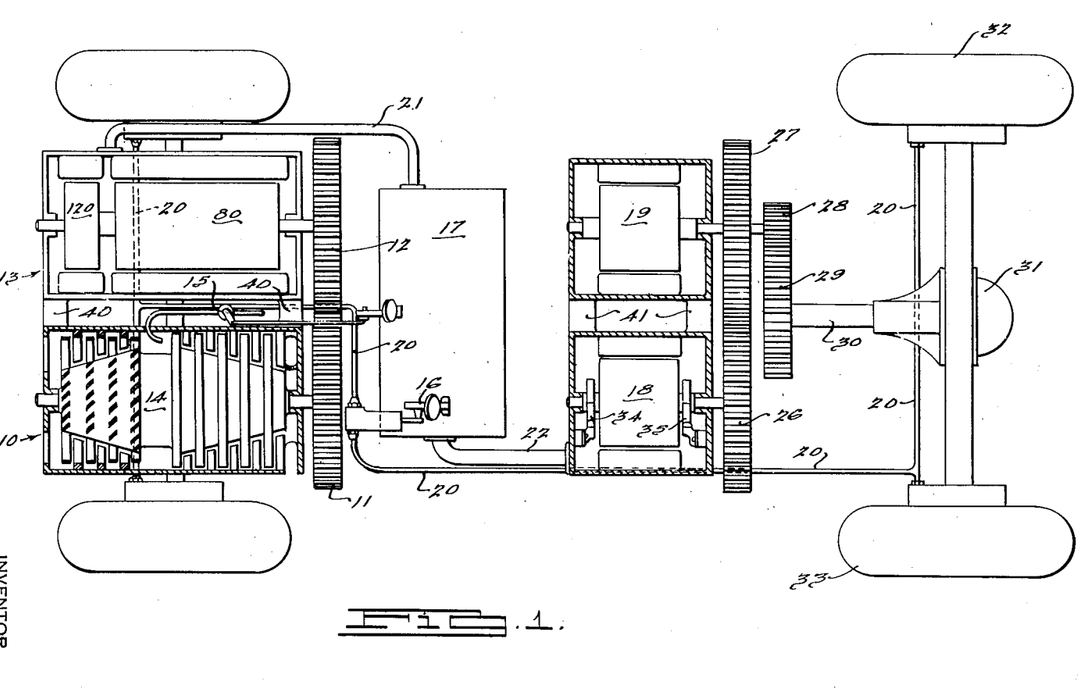
Fig. 1 is a diagrammatic view of a vehicle chassis embodying my invention.
Figure 6:
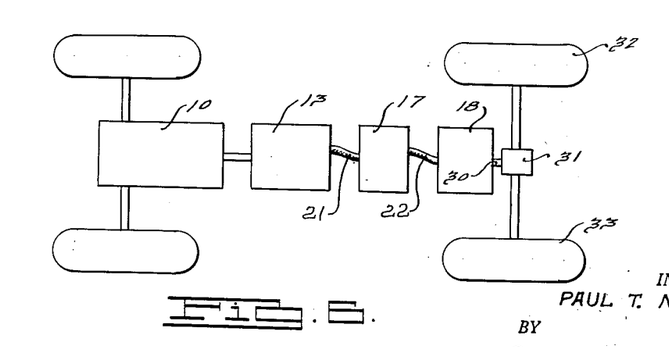
Fig. 6 is a diagrammatic showing of a modified form of my invention.

Referring to Fig. 1, the gas turbine 10 drives a gear 11 which meshes with gear 12 coupled to drive a polyphase alternator 13, which is preferably of the three phase type but which could be of any number of phases. The turbine 10 is essentially a high speed mechanism and may rotate in the neighborhood of 24,000 R. P. M. and as such its gyroscopic effect would be pronounced in the steering of the motor vehicle. To counteract this effect the alternator 13, which is rigidly secured to the turbine 10 by webs 40, is rotated in the opposite direction. The polar moment of inertia of the turbine rotor 14 and the total moment of rotors 80 and 120 are preferably substantially the same. Throttle 15 controls the fuel flow to the turbine 10 while the brake pedal 16 controls the fluid pressure in the hydraulic brake lines 20. The power generated in alternator 13 is conducted by means of power lines within cable 21 to the frequency changer or converter 17 which supplies the two polyphase motors 18 and 19 through power conductors carried in cable 22. The housings of motors 18 and 19 are rigidly secured together as by webs 41. The motor rotors are arranged to rotate in opposite directions to neutralize their gyroscopic effect. Gears 26 and 27 intermesh and are respectively driven by motors 18 and 19. The output power from motors 18 and 19 is transmitted through gearing 28 and 29 and drive shaft 30 to the usual differential 31 which drives wheels 32 and 33. Carried on and driven by motor 18 are a pair of circuit interrupters 34 and 35, which are connected by lead wires 36, 37, 38ª and 39ª, within cable 22 to the converter 17. In the event the gyroscopic effect is not to be taken into account, the turbine 10 and alternator 13 may be directly coupled together and a single motor may be used for driving the wheels 32 and 33 with the rotating members arranged in tandem as schematically illustrated in Fig. 6.

Figure 3:
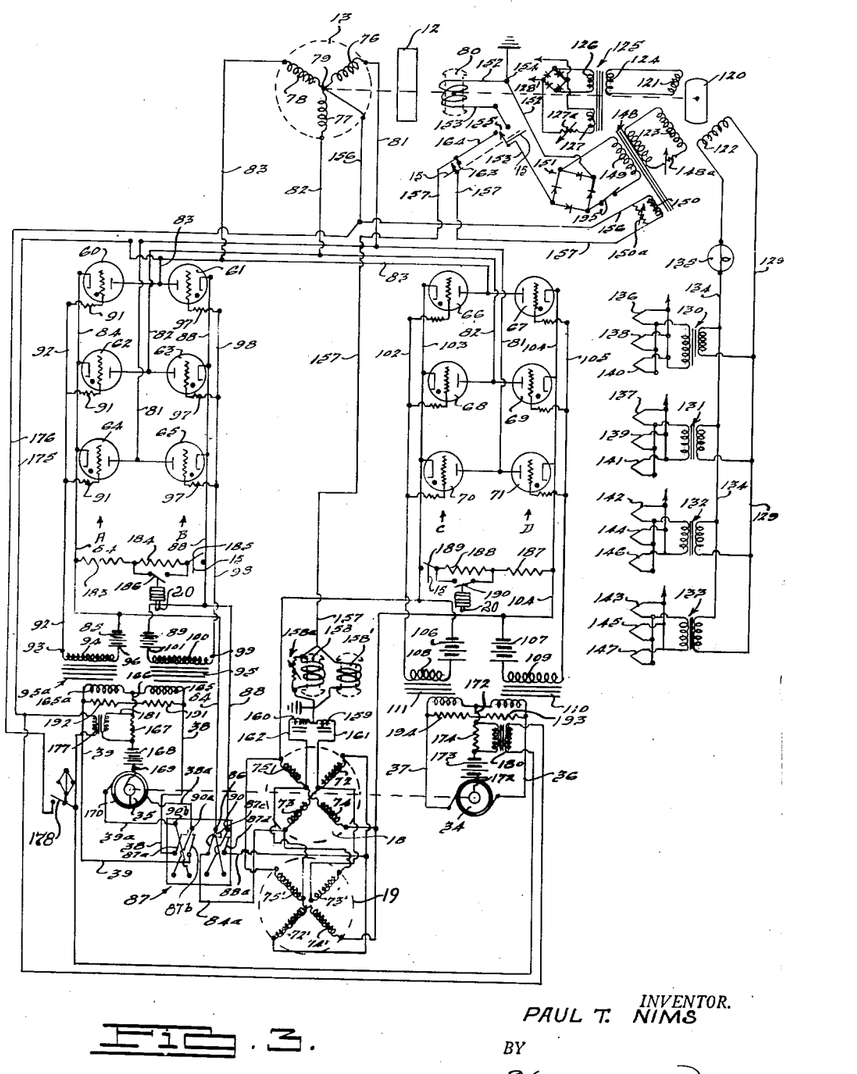
Fig. 3 is a wiring diagram of the electrical circuit used in my invention.

The frequency converter is shown in detail in Fig. 3 and comprises a first set A of gas filled triodes 60, 62, and 64; a second set B of triodes 61, 63, and 65; a third set of triodes 66, 68, and 70; and a fourth set D of triodes 67, 69, and 71. Set A is arranged to supply the third phase flux-inducing windings 73, 73' in the fields of the polyphase motors 18 and 19, while sets B, C, and D are arranged to supply the first, fourth and second flux-inducing phase windings 72, 72', 75, 75', and 74, 74' respectively, of motors 18 and 19. For convenience in describing the operation of the converter 17 reference will be made to the elements of motor 18 only, it being understood that the two motors 18 and 19 are exactly the same except that two of the phases of motor 19 are reversed in polarity with respect to those of motor 18. The two motors 18 and 19 are connected in parallel and will operate similarly. Where referred to specifically, the elements of motor 19 will be indicated by the same reference characters as those of motor 18 but with prime exponents added.

The three phase alternator 13 comprises a first phase winding 76, a second phase winding 77, and a third phase winding 78 arranged in Y connection having a common center point 79. The alternator 13 has a wound rotor 80 driven by gear 12 for inducing a voltage in the windings 76, 77 and 78. Preferably the voltages are displaced 120° apart. Winding 76 is connected by conductor 81 to the anodes of triodes 64, 65, 70, and 71, winding 77 by conductor 82 to the anodes of triodes 62, 63, 68, and 69, and winding 78 by conductor 83 to the anodes of triodes 60, 61, 66, and 67. The cathodes of triodes 60, 62, and 64 are connected together by conductor 84 which is connected to positive side of battery 85, and one terminal 86 of a four pole, double throw reversing switch 87. The cathodes of triodes 61, 63, and 65 are connected together by conductor 88 which is connected to the positive side of a battery 89 and to a second terminal 90 of the reversing switch 87. Lead wires 38ª and 39ª are connected to the third and fourth terminals 90ª and 90ᵇ respectively of switch 87. Lead wires 38 and 39 are connected respectively to the switch blades 87ª and 87ᵇ. Blades 87ᶜ and 87ᵈ are respectively connected by conductors 84ª and 88ª to windings 73, 73', and 72, 72' respectively. The grids of triodes 60, 62, and 64 are each connected through resistors 91 to a conductor 92 which is connected to one terminal 93 of a secondary winding 94 of transformer 95ª. The other terminal 96 of winding 94 is connected to the negative side of battery 85. Likewise the grids of triodes 61, 63, and 65 are each connected through resistors 97 to a conductor 98 which is connected to one terminal 99 of a second secondary winding 100 of transformer 95. The other terminal 101 of winding 100 is connected to the negative terminal of battery 89 having its positive terminal connected to the cathodes of triodes 61, 63 and 65.

Similarly the sets C and D of triodes are connected by conductors 102, 103, 104, and 105 to batteries 106 and 107 and secondary windings 108 and 109 of transformers 111 and 110 respectively. The cathodes of triodes 66, 68, and 70 are directly connected to windings 75 and 75', and those of triodes 67, 69, and 71 to the windings 74 and 74'. Since it is only necessary to reverse the direction of current flow in windings 72, 72', and 73, 73', with respect to that in windings 74, 74' and 75, 75', and consequently the terminals of interrupter 35 for causing the direction of rotation of motors 18 and 19 to be reversed, no reversing switch is used for sets C and D of triodes and interrupter 34. This deversing switch is used when it is desired to reverse the direction of travel of the vehicle.

Directly connected for rotation with the alternator 80 is a permanent type magnet exciter rotor 120 which rotates relative to the alternator windings 121, 122, and 123. The winding 121 is connected to the primary 124 of transformer 125 having a saturable core with a secondary 126 and a saturating coil 127 connected into a full wave rectifier circuit 128, the output of which is conducted to the storage battery of the vehicle or other direct current accessories (not shown). A variable resistor 127ª is connected in series with winding 127 and acts to adjust the current flow therethrough for adjusting the voltage induced in winding 126.

One terminal of the winding 122 is connected by a lead wire 129 to one side of the primary windings of transformers 130, 131, 132, and 133. The other side of the primary windings of transformers 130, 131, 132, and 133 is connected by lead wire 134 back to the other terminal of the winding 122. There is inserted in series in the lead wire 134 a ballast lamp 135, which may be of the hydrogen-filled type in which a resistance element acts by heating and cooling to regulate the current flowing therethrough and to maintain it within predetermined limits. The triodes 60–71 are preferably of the hot cathode type which have heater elements 136–147, respectively, which for convenience are shown separate from the triodes but which in physical location are positioned one within each of the triodes in heat exchange relation with the respective cathodes. The heater elements 136, 138, and 140 are connected in parallel and to the secondary of transformer 130 while elements 137, 139, 141; 142, 144, 146 and 143, 145, 147 are similarly connected to transformers 131, 132, and 133, respectively. In order for the cathode of each triode to be maintained at the same potential as the heating element for the same triode, one side of the secondary winding of the transformers 130–133 is connected to the cathode of the set of triodes heated by energy furnished by the particular transformers.

Winding 123 is connected to the primary of a saturated core type transformer 148 having a secondary winding 149 and a saturating core winding 150. A variable resistor 150ª in parallel with winding 150 acts by by-passing current to control current flow through winding 150 and thereby the regulation imparted to winding 149.

The winding 149 is connected to a full wave rectifier circuit 151, the direct current output of which is conducted by lead wires 152 and 153 to the coil of the wound rotor 80. The lead wire 152 is grounded as at 154 for a purpose to be more fully explained hereinafter. A throttle controlled single pole double throw switch 155 is interposed in lead wire 153 with the movable contact member continually connected to the rectifier circuit and one of the fixed contact members connected to the portion of lead wire 153 connected to the winding of rotor 80. The switch 155 in normal or vehicle operating position with the throttle 15 open for vehicle operation closes the circuit through lead wire 153. The common point 79 of alternator 13 is connected by lead wires 156 and 157 through winding 150 to the coil of rotor 158 of motor 18. The other end of the coil of rotor 158 is connected to a common terminal of each of a pair of reactors 159 and 160. This common terminal of the reactors 159 and 160 is connected to ground. The other terminal of reactor 159 is connected by lead wire 161 to the center tap connection or common end of flux-inducing windings 72 and 73, while the other terminal of reactor 160 is connected by lead wire 162 to the center tap connection or common end of flux-inducing windings 74 and 75. A single pole single throw switch 163 is interposed in lead wire 157 and is throttle controlled synchronously with switch 155. When in normal or vehicle operating position, switch 163 is closed to complete the circuit through lead wire 157. A lead wire 164 connects the portion of lead wire 157 intermediate rotor 158 and switch 163 with the second fixed contact member of switch 155 so that when the throttle control is closed the switch 163 opens and the switch 155 connects lead wires 153 and 164.

The lead wires 38 and 39 are connected to the opposite ends of primary windings 165, 165ª of transformers 95, 95ª, respectively. The other ends of the primary windings are connected to common terminal 166 which is connected by a conductor to one end of a resistor 167 having its other end connected to the negative terminal of a battery 168. A lead wire 169 connects the positive terminal of battery 168 to the conducting half 170 of interrupter 35. The opposite ends of the primary windings of the transformers 110, 111, are similarly connected to interrupter 34 by lead wires 36 and 37. The other ends of the primary windings of transformers 110, 111, are connected by a common conductor 172 having inserted therein a battery 173 and a resistor 174. Lead wires 175 and 176 connect the primary windings of transformers 177 and 180 across winding 78 of alternator 13. A centrifugally operated switch 178 rotatable with interrupter 35, controls the energization of transformers 177 and 180 and acts at a vehicle speed of approximately one mile per hour to open the circuit through wire 176 and to close the circuit at lesser vehicle speeds. One terminal of the secondary winding of transformer 177 is connected to the end of resistor 167 adjacent the terminal 166. The other terminal of the secondary coil of transformer 177 is connected to the end of resistor 167 which is connected to the negative terminal of battery 168. Similarly transformer 180 is connected across the resistor 174.

A resistor 183 has one terminal connected to conductor 84 and its other terminal connected to one terminal of a resistor 184. The other terminal of resistor 184 is connected through switch 185 to conductor 88. A second switch 186 shunts resistor 184. Similarly resistors 187 and 188 are connected in series and through switch 189 to conductors 103 and 104 with a switch 190 shunting resistor 188. The switches 185 and 189 are controlled by the throttle and act to close the circuit therethrough upon closure of the throttle while switches 186 and 190 are controlled by the vehicle braking system control and are closed upon initial movement of the brake control to operate the vehicle brakes. Connected in parallel with the primary windings of transformers 95, 95ª, 110 and 111, are resistors 191, 192, 193 and 194 respectively.

My device operates as follows:

Assume that it is desired to operate the vehicle and the throttle 15 is opened to supply fuel to the turbine 10, rotation of the turbine 10 will drive the alternator rotor 80 and exciter rotor 120 within their respective windings 76–78 and 121–123, respectively. The rotor 120 being of the permanent magnet type will cause a voltage or electromotive force to be induced in the windings 121–123. The induced voltage in winding 121 causes a current to flow through primary 124 of transformer 125 which causes an alternating current to flow through the secondary 126 into the full wave rectifier circuit 128 and unidirectional current to flow through the output circuit to the vehicle storage battery and/or other vehicle accessories. Undirectional current also flows through saturation winding 127 controlled by the resistor 127a so that as the voltage increases in the secondary 126 with a corresponding increase of current flow through winding 127 the core of transformer 125 will be saturated a predetermined amount thus cutting down the voltage induced in the secondary 126 so that its output voltage and current are maintained within predetermined limits to prevent damage to the battery and/or other vehicle accessories. At the same time, voltage is induced by rotor 120 into winding 122 so that current flows through lead wire 129 to the primary coils of transformers 130–133 and therefrom through lead wire 134 and ballast lamp 135 back to the winding 122. The ballast lamp 135 acts, as is well known in the art, to maintain the current flow in the circuit within predetermined limits. The heater elements 136, 138, and 140 are connected in parallel across the secondary of transformer 130 and are energized thereby to heat their associated cathodes of triodes 60, 62, and 64. Likewise the elements 137, 139, 141; 142, 144, 146; and 143, 145, 147 are respectively energized by transformers 131, 132, and 133 to maintain their associated cathodes at an elevated temperature.

Rotor 120 also induces a voltage in the winding 123 which causes current to flow therethrough and through the primary of transformer 148 which is controlled in magnitude by the resistor 148a. This current, of course, will be a varying one and cause an alternating or pulsating current to flow in the secondary 149 which is conducted to a full wave rectifier circuit 151. The rectified current from circuit 151 flows through lead wires 152 and 153 to energize the alternator rotor, switch 155 being in closed circuit position relative to lead wire 153 due to opening of the throttle 15 beyond that necessary to supply idling fuel to the turbine 10.

The excited rotor 80 induces an alternating voltage or electromotive force in windings 76–78 which voltages preferably reach their peaks 120° from each other. The induced voltage in winding 76 is transmitted through conductor 81 to the anodes of triodes 64, 65, 70, and 71 and when these triodes or electric valves permit, current will flow there through in timed sequence to the cathodes of the triodes and in accordance with whichever triode is firing or passing current through conductor 84 to windings 73, 73', conductor 88 to windings 72, 72', conductor 103 to windings 75, 75', or conductor 104 to windings 74, 74'. Likewise windings 77 and 78 are connected respectively to the anodes of triodes 62, 63, 68, 69 and 60, 61, 66, 67, respectively, and the corresponding cathodes of these triodes 60, 62; 61, 63; 66, 68; and 67, 69 to conductors 84, 88, 103, and 104, respectively, for controlling current flow from the alternator 13 to the motor 18, it being evident that any of the generator windings 76–78 may supply any of the motor windings 72–75. The triodes 60–71 each supply a pulsating direct current to the motor 18 and due to the relationship of windings 72, 72', 73, 73'; and 74, 74'; 75, 75', this pulsating direct current will set up a rotating field in the motor 18.

Current supplied to windings 72 and 73, which are connected together at the common center tap at one end thereof, is returned through lead wire 161, reactor or impedance 159, rotor 158, and parallel resistance 158a, lead wire 157 back to the center or common point 79 of the windings 76–78. Current supplied to windings 74 and 75, likewise connected together at their end points, is returned through lead wire 162 and reactor or impedance 160 to the paralleled resistance 158a and rotor 158 for flow through lead wire 157 back to windings 76–78. The saturation winding 150 of transformer 148 and its parallel resistor 150a are connected in series with the lead wire 157 so that all of the current flowing through motor 18 will flow therethrough. That flowing through winding 150 acts by its saturating effect on the core of transformer 148 to regulate the current supplied to the alternator rotor 80.

At any given rate of fuel flow or throttle setting and speed, the turbine 10 will produce a given substantially constant horsepower output at a given torque. As the turbine and connected alternator speed increase, assuming no compensation and no change in fuel flow, because of a drop in load torque, the operating temperature of the turbine 10 would decrease with a corresponding loss of efficiency and horsepower output. If the turbine and connected alternator speed decrease, again assuming no compensation and no change in fuel flow, because of increased torque, the operating temperature of turbine 10 would increase beyond safe limits and a failure would be probable. With my compensating transformer 148 and winding 150, I am able to automatically adjust the voltage and current flowing through the alternator-motor system so that the product of the alternator voltage E and current I is substantially a constant for any speed of the alternator-turbine combination irrespective of motor speed, thereby providing an ideal load for the turbine 10.

Suppose, for example, that the driven vehicle begins to travel up an incline. This requires an increased torque output to be delivered by the motor 18 to the wheels 32 and 33. The motor 18 begins to slow down and its back self-induced voltage is decreased. This permits the current flowing therethrough to increase and likewise an increased current flow through the winding 150. The greater the current flow through winding 150 the greater will be the flow of constant flux through, or saturation of, the core of transformer 148 and the less the changing flux. This reduced changing flux results in a lower induced voltage in secondary 149 with a corresponding reduced current flowing through alternator rotor 80. This reduced current in rotor 80 will lower the voltage induced in alternator windings 76–78, which in turn will reduce the current flowing from the alternator 13 to motor 18. The effect will be a controlled current flow through the system in which the product of E and I or power output of alternator 13 will be substantially constant. The variable resistor 150a, in parallel circuit relationship with the winding 150, is adjusted to permit a greater or less portion of the current flowing through the windings with respect to that flowing through the lead wire 157 to accomplish this result and to compensate for any change in the angle between the current and voltage. Therefore, the horsepower output of the alternator 13, with increase in torque required to propel the vehicle, will remain substantially constant and the turbine will continue to operate at its rated speed and horsepower output with a decrease in vehicle speed. Similarly, if the vehicle begins a descent the back self-induced voltage of the motor 18 will increase thereby decreasing the current flow through motor 18 and the voltage generated by alternator 13 will increase to maintain the constant EI output because of the decreased saturating effect of the winding 150.

It will be noted that the rotors 80 and 120 are on the same shaft and rotate at the same speeds. An increase in speed of one is accompanied by a corresponding increase in speed of the other. Since the voltage induced in the alternator windings 76-78 is directly proportional to the current flowing through rotor 80 and also to the first power of the speed of rotation of rotor 80 and the voltage of winding 123 is directly proportional to the first power of the speed of rotation of the rotor 120; it may be seen that, without the compensating effect of the winding 150, the output of the alternator 10 would be proportional to the square of the alternator speed. But since, as has been seen heretofore, the winding 150 is operable to reduce the current in the rotor 80 in proportion to the increased current flow through the motor 18, this winding 150 will cause the output of alternator 13 to increase substantially according to the first power of the alternator speed rather than according to the second power. This result is highly desirable because the horsepower output of the turbine 10, within the operating range, is substantially proportional to the first power of the turbine speed. The output of turbine 10 is, therefore, in matched relationship with the alternator 13.

Suppose the operator of the vehicle desires to increase its speed, assuming it to be operating on a level plane, the throttle 15 is opened somewhat to provide an increased rate of fuel supply to the turbine 10. The turbine speed increases somewhat and with it the speed of the rotors 80 and 120. As has been hereinbefore explained, the output voltage of the alternator windings 13 will increase. The motor 18 up to the time the throttle 15 was opened will at this time be operating at a given speed and with a given self-induced back voltage. The increased alternator output voltage will result in an increased current flow through motor windings 72-75 with a consequent increase in motor output. Since the increase in the output voltage of alternator 13 is substantially in accordance with the square of the speed and the increased current flow through the motor windings 72-75 and compensating winding 150 only acts to reduce the output of alternator 13 by the first power of the speed, the net result will be an increased output of alternator 13 in accordance with the increased output of the turbine 10 both substantially according to the first power of the speed. The motor 18 is directly connected across the output of the rectifying or frequency changing circuit and operates at such a speed that it will absorb all of the energy generated by the alternator 13 as will be hereinafter described.

The frequency changing or rectifying circuit operates as follows: When motor 18 is rotating, as will occur during operation of the vehicle, the interrupters 34 and 35 will be rotating and energizing alternately the circuits through lead wires 36, 37, 38, and 39. As each of these circuits is energized, a voltage will be impressed upon the primary windings of transformers 110, 111, 95, and 95a. The transformer primary windings are preferably of high impedance so that an appreciable length of time is required for the current flow to reach its peak value. Such period of time for all except very slow speed operation of the motor 18 is greated than the time the interrupters are causing the circuits to be energized so that the flux is continually changing and inducing a voltage in the secondary windings 109, 108, 100, and 94, respectively. The voltage so induced upon closing of the respective circuits by the interrupters 34 and 35 is in opposite polarity to the batteries 107, 106, 89, and 85 and of a much greater magnitude. The batteries 107, 106, 89 and 85 are of only a few volts potential and act in the usual manner of maintaining, except when the triodes are firing, the potential of the cathodes positive with respect to the potential of their respective grids.

The windings 76, 77 and 78 are sequentially elevating the potential of the anodes of triodes 64, 65, 70, 71; 62, 63, 68, 69; and 60, 61, 66, 67, respectively, at the same time the interrupters 34 and 35 are impressing a voltage on the transformers 110, 111, 95, and 95a which in turn are overcoming the biasing effect of batteries 107, 106, 89, and 85, respectively, sequentially rendering the potential of the grids of the sets of triodes D, C, B, and A, respectively, positive with respect to their associated cathodes. The change in potential of anodes and grids with respect to cathodes are being independently carried on and in no particular relationship with each other. However, whenever the anode, grid, and cathode of any one triode are respectively positive, positive and negative, the triode will ionize and will fire or pass current therethrough and will continue to fire or pass current each time the anode is rendered positive until the grid is again rendered negative with respect to the cathode whereby the triode is de-ionized at the next instant at which the current flow therethrough becomes zero.

At all normal speeds of motor 18 the current flow through the primary windings of the transformers 95, 95a, 110 and 111 will be continually increasing due to the impedance of the said transformers during the period the triodes are firing and, therefore, a voltage tending to render the grids positive with respect to the cathodes is continually being applied. At the instant the interrupter 34 or 35 breaks the circuit through the associated transformer, the voltage thereacross supplied by the batteries 173 or 168 drops to zero and the primary winding of the respective transformers discharges through the respective resistors 191, 192, 193, or 194, quite rapidly thereby collapsing the flux in the transformer cores and inducing a voltage in the corresponding secondary winding which is in the same polarity as batteries 107, 106, 89, or 85, which provides the potential necessary to render the grids of the respective sets of triodes highly negative with respect to their associated cathodes. The affected triode is thereby rendered ineffective to transmit current after the pulsating current reaches zero therethrough in accordance with the alternating electromotive force impressed upon the anodes by the windings 76—78. Due to the constant potential of the battery, the action of the interrupters 34 and 35 through the transformers 110, 111, 95, and 95a impress an almost square shaped wave form of voltage upon the grids so that they are substantially instantaneously with the action of interrupters 34 and 35 rendered positive and negative as desired.

If the cathodes are rendered positive with respect to the anodes, the triodes will also cease firing. This is accomplished by reactors 159 and 160 inserted in the return circuit from windings 72, 73, and 74, 75, respectively. Assuming the interrupter 34 in the position shown in Fig. 3, the set C of triodes will be passing current in sequence to the winding 75 of motor 18. Substantially at the instant the interrupter 34 has rotated sufficiently to break the circuit through wire 37 and make the circuit through wire 36, the set D of triodes will be in a condition to start the flow of current to winding 74 whenever the anodes are in proper condition, all as hereinbefore described. During the period that the set C of triodes is firing, the potential of the common point of windings 74 and 75 will be substantially that of point 79 while the end of the winding 75 connected to conductor 103 will be substantially the same potential as the end of winding 76, 77, or 78 whichever is supplying current to the set C. This potential condition continues to exist across winding 75 at the time the interrupter 34 changes from the firing of set C to the firing of set D, which change is by reason of interrupter 34 opening the primary circuit in transformer 111 to collapse the field therein for rendering the grids of tube set C greatly negative with respect to the tube cathodes and completing the primary circuit in transformer 110 to build up a field therein for rendering the grids of tube set D positive. Substantially simultaneously with the rendering of the grids of tube set C greatly negative, tube set D will subsubsequently fire (very shortly after the interrupter 34 has so acted to complete the primary circuit in transformer 110) and then immediately following the occurrence that the first triode of set D fires, the potential of the end of winding 74 connected to conductor 104 is elevated to the potential of the end of winding 76, 77, or 78, whichever is connected to the firing triode. The potential of the center tap or common point of windings 74 and 75 and the end of winding 75 connected to conductor 103 is instantaneously elevated above the potential at which they were just previously operating an amount equal to the potential impressed on the winding 74 by conductor 104 which acts to instantaneously render the cathodes of triodes 66, 68, and 70 very much positive with respect to the anodes and render the triodes ineffective to conduct current. The impedance of reactor 160 is effective to cause this potential change because of its temporary blocking of increased current flow through wire 157. Hence substantially simultaneously the potential of the cathodes of C set triodes 66, 68 and 70 is elevated to a potential above that of the anodes and the potential of the grids thereof is lowered to a greatly negative potential with respect to the potential of said cathodes prior to said increase in cathode potential. When a triode is firing, the fluid within the housing is ionized and the ionized fluid is the medium by which the current is conducted through the tube. When the tube ceases firing because of a drop in anode potential below that of the cathode or the current supply falls to zero, there is a time lapse required to de-ionize the fluid. This time interval is quite small but if the frequency of the voltage and current supply is high, the potential of the anode may again exceed that of the cathode before the fluid is deionized. In such an event the triode would again fire or pass current. With my circuit, using the interrupters 34 and 35 in connection with the high impedance transformers 95, 95ª, 110 and 111, the reactors 159 and 160, I am able to de-ionize the fluid in an exceedingly short time interval and, stop the firing of the triode without waiting for the voltage to reach zero due to the action of the generator. As heretofore described, the firing of the triodes in set A, following the firing of set B, will transiently elevate the potential of the entire winding 72 which will raise the potential of the cathodes of the triodes of set B to a higher potential than any of the anodes of set B. The time interval of this elevation is very short and may possibly be shorter than the time interval required to de-ionize the fluid in the triode. If such were the case, the firing triode would again fire as soon as the transient was over. However, by combining with the above positive means for rapidly de-ionizing the triodes in a lesser time interval than that of the transient, the triodes could be positively rendered ineffective to conduct current substantially instantaneously. This sweeping action to clear the triode of ionized fluid or decrease of de-ionization time is accomplished by the rendering of the triode grid highly and substantially instantaneously negative with respect to either the cathode or anode. This seems to cause the grid to attract and rapidly collect all of the positive ions in the triode and, markedly, more rapidly than without this action. As is well known, the grid by itself cannot stop the triode from firing once it has commenced until by some other means the current reaches zero and then if it is zero for sufficient time for the tubes to de-ionize.

The interrupters 34 and 35 are as shown directly connected to and rotatable with the motor rotor 158 so that when the driven vehicle is at a standstill the interrupters are ineffective to place the triodes in firing condition. To operate at least a portion of the triodes in such an event the transformers 177 and 180 are made use of which are continually energized by alternating current supplied from winding 78 of alternator 13 through closed switch 176. Under these conditions with the throttle opened to start the vehicle from a standstill a potential will be imposed in the windings 94 or 100 and 108 or 109 depending upon the position the interrupters happened to assume when the vehicle came to a standstill to render the potential of the grids positive with respect to their associated cathodes to cause firing of the triodes. Generally speaking under these conditions only the triodes 60, 61, 66, and 67, connected to the same winding 78 as is the supply to transformers 177 and 180, will have impressed upon them the proper potentials to place anode, grid, and cathode in condition for firing the triodes so that at the instant of starting of the vehicle only two triodes are supplying power to the motor 18. It will be noted that both of the transformers 177 and 180 are fed from the same winding 78 of alternator 13, and that therefore triodes from two groups or sets are firing substantially simultaneously. Suppose as is shown in Fig. 3 triodes 60 and 66 are both firing. Windings 73 and 75 will be energized and the resultant magnetic or flux field will be substantially midway between these windings. If the rotor 158 were aligned with this field no torque would be produced by the rotor 158 to drive the vehicle wheels 32 and 33. Therefore, it is necessary to so relate the interrupters 34, 35; rotor 158 and physical relation of windings 72-75 that the rotor 158 is not aligned with the field so produced by concurrent energization of two adjacent motor windings. The rotor preferably is phased approximately 90° behind the resultant field so that it will tend to be rotated into alignment or in phase with this field. As soon as the rotor 158 does move to attempt to align itself with this field the interrupter 35 will have been rotated to cause the transformer 177 to fire triode 61 to energize winding 72, interrupter 34 will still be causing transformer 180 to fire triode 66 and winding 75 will remain energized. Subsequent rotation will transfer transformer 180 to the circuit through wire 36 for firing triode 67 for energizing winding 74 while triode 60 will still be firing. Continued rotation will again cause interrupter to cease firing triode 61 and again fire triode 60 and so on so that at all times two adjacent motor windings 73, 75; 75, 72; 72, 74; or 74, 73 will be energized. After the vehicle has commenced to move, say at a speed approximately 1 mile per hour, the centrifugal switch 178 will act to open and the control of the triodes will be taken over by the interrupters and instead of only the triodes connected to one phase of the alternator supplying substantially the entire power to the motor 18 all of the alternator phases and triodes will be rendered effective to supply power as hereinabove described. It will be evident from the foregoing that the motors 18 and 19, because of the interrupters 34 and 35, will operate as a synchronous motor at any speed depending on the torque required by the vehicle, the rotating flux field being controlled by and dependent upon the motor speed.

To prevent any power from being generated by alternator 13 when it is desired that the vehicle remain stationary or decelerate, the throttle 15 is moved to idle position and switches 155, 163, 185, and 189 operated. Switch 155 is opened to de-energize the circuit through wire 153 to alternator rotor 80 and closed to energize the circuit from wire 164 to wire 153 and to the rectifier circuit 151. It will be recalled that rectifier circuit 151 experiences pulses of current which originate in transformer 148 energized by exciter rotor 120. At the same time switch 163 is opened disconnecting the circuit from the motor rotor 158 to the point 79 of alternator 13. This action provides a circuit from the full wave rectifier 151, wire 152 to ground 154, the grounded connection of reactances 159, 160, rotor 158, wires 157, and 164, switch 155, and wire 153 to the rectifier 151 so that rotor 158 will remain excited. Alternator 13 will be completely de-energized and no power will be generated thereby since for power generation rotor 80 must be excited. If the vehicle is at rest or not moving, there is nothing as far as the turbine is concerned to cause movement and any externally imparted movement will be resisted by the energized motor rotor 158 as will be evident from the description of the decelerating operation. If the vehicle is decelerating, the wheels 32, 33 will be rotating the energized motor rotor 158 within the windings 72-75 thereby causing the flux produced by rotor 158 to induce voltage in the groups of windings 72, 73, and 74, 75. Switches 185 and 189 were closed by closure of the throttle 15 to idling position thereby closing circuits through load resistors 183, 184, and 187, 188 which respectively place a load on windings 72, 73 and 74, 75. The motor 18 then becomes an alternator connected to a resistance load and movement of the vehicle is retarded due to the work being done by the motor 18 in heating the resistances 183, 184, 187, and 188. If the deceleration so produced is not sufficient to satisfy the operator of the vehicle the brake pedal 16 may be operated which in its initial movement closes switches 186 and 190 shunting out resistors 184 and 188 respectively, thereby increasing the load connected to motor 18 operating as an alternator for decelerating the vehicle, it being well known that with constant applied voltage to a resistance, a decrease in value of the resistance increases the load on the circuit. If additional deceleration is desired the brake pedal 16 is pushed further and the normal friction brakes of the vehicle operated by hydraulic lines 20 are rendered effective, in addition to the above, to resist vehicle movement.

The manual switch 195, when opened, acts to positively de-energize the secondary circuit of transformer 148 and will act similarly to the gear shift of the usual gear driven vehicle and render the regenerative braking ineffective producing a free-wheeling effect and at the same time positively rendering the turbine 10 ineffective to drive the vehicle irrespective of the setting of throttle 15.

Simultaneous reversing of switches 87$^a$—87$^b$ and 87$^c$—87$^d$ will reverse one pair of windings of each of the motors 18 and 19 and the connections between interrupter 35 and transformers 95 and 95$^a$. This causes the motors 18 and 19 to reverse their direction of rotation and thereby to drive the vehicle backward. It is necessary to reverse the connections between the interrupter 35 and transformers 95 and 95$^a$ as well as the connections to one phase of the pair of two-phase motors 18 and 19 in order that the windings of the motors may be energized in the proper sequence. If interrupter 34 and the other pair of windings of each of the motors 18 and 19 were also reversed, the motors would continue to rotate in the original direction. Therefore, for reversal of the motors as aforesaid reversing of interrupter 34 and the said other pairs of windings is unnecessary. The tubes and their associated circuits continue to operate in the manner originally described.

Figure 4:
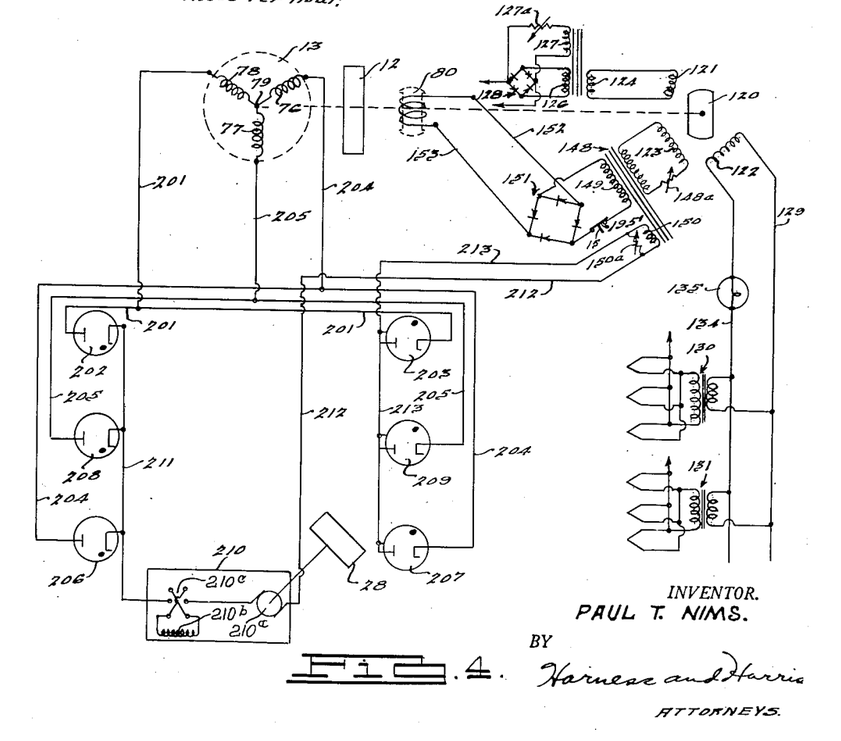
Fig. 4 is a wiring diagram of a modified electrical circuit using features of my invention.

Fig. 4 shows a modified circuit embodying the compensating feature for maintaining a constant E. I. output from the generator but using a unidirectional current motor for driving instead of the pulsating polyphase type of Fig. 3. Like numerals are used to designate like parts to those in the preceding figures. This arrangement uses the alternator 13 with its rotor 80 and windings 76-78. Winding 78 is connected by conductor 201 to the anode of diode 202 and cathode of diode 203, windings 76 and 77 are likewise similarly connected by conductors 204 and 205 to the anodes and cathodes of diodes 206, 207 and 208, 209, respectively. The cathodes of diodes 202, 206, and 208 are connected together and to one side of a unidirectional current motor 210 by a conductor 211. The motor 210 includes an armature 210$^a$ driving gear 28, a field 210$^b$, and a reversing switch 210$^c$ for the field 210$^b$. The other side of motor 210 is connected by a conductor 212 to one side of the saturating winding 150 and the shunt resistor 150$^a$. The other side of the winding 150 and shunt resistor 150$^a$ are connected by conductor 213 to the anodes of diodes 203, 207, and 209. When the throttle is closed to idling position the switch 195' is opened rendering the alternator 13 ineffective to supply power. Depressing of the pedal 16 operates the usual friction brakes of the vehicle. Voltage induced in windings 76-78 causes a current to flow through diodes 206, 208, or 202 whenever the potential of the respective anode is higher than that of the respective cathode, current so conducted flows through conductor 211, the motor 210, conductor 212, compensating winding 150 and shunt resistor 150ª, and conductor 213 to the anodes of diodes 205, 207, and 209. As the potentials of the cathodes of these diodes become negative with respect to the respective anodes the current passes through the diodes back to the windings 78, 76, and 77 to complete the circuit.

This arrangement acts to supply unidirectional current to the motor 210 in the manner described for driving the vehicle wheels 32, 33 through the differential 31, drive shaft 30, and gears 29 and 28. As explained in detail with respect to the apparatus of Fig. 3, current flowing through the saturating winding 150 acts to maintain a constant E. I. output for every speed of the alternator to balance the power delivered by the turbine 10 with that delivered by the alternator 13 so that at every horsepower output of the turbine 10 the alternator-turbine combination will be operating at a substantially constant torque and speed. The motor torque and speed may vary with the torque required by the vehicle without any effect on the speed and torque of the alternator so long as the product of motor torque and speed remains constant and this will remain substantially constant because of the substantially constant E. I. output of the alternator.

Reversal of the switch 210ᶜ acts upon the field 210ᵇ to reverse the direction of rotation of the armature 210ª and the gear 28. This causes the vehicle to move backwards. The remainder of the circuit of Fig. 4 is left unchanged during the reversing.

Figure 5:
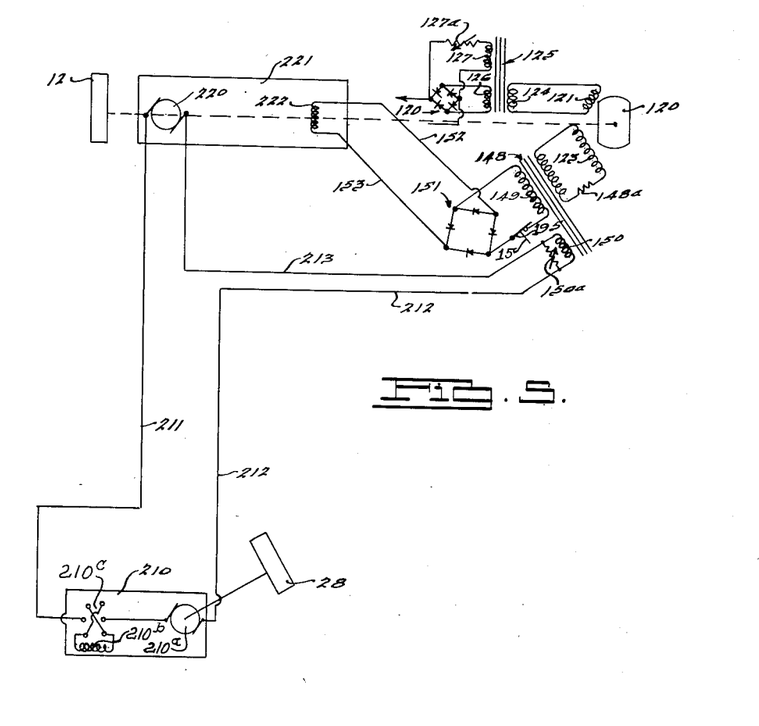
Fig. 5 is a wiring diagram of another modified electrical circuit using features of my invention.

The modification of Fig. 5 shows an arrangement whereby the turbine drives through gear 12 the armature 220 of a direct current generator 221 having a direct current field 222. The armature 220 supplies direct current through the usual commutator (not shown) to conductor 211 connected to one side of the direct current motor 210. Current from the motor 210 is conducted by the conductor 212 connected to the other side of motor 210 to the compensating winding 150 and resistor 150ª from whence the current is conducted by conductor 213 back to the armature 220. This arrangement eliminates completely the use of electronic control valves but due to the use of the compensating winding 150 controlling the generator field 222 the same constant E. I. is maintained at the output terminals of the generator 221 in the same manner as hereinbefore described. The turbine-generator combination, therefore, operates as in the other arrangements at a constant speed for each horsepower output of the turbine 10 and its speed is not influenced by the torque required by the vehicle it is driving.

Reversal of the direction of movement of the vehicle for the apparatus of Fig. 5 is effected by reversal of switch 210ᶜ, which acts through field 210ᵇ to reverse the direction of rotation of armature 210ª and gear 28. The rest of the circuit of Fig. 5 stays unchanged during this reversing.

With my invention, therefore, I am able to obtain in effect an infinite number of speed ratios of drive between the prime mover or turbine 10 and vehicle wheels 32 and 33 and have provided means whereby a vehicle may be satisfactorily driven by a gas or internal combustion turbine having a substantially constant torque and speed for each horsepower output. It is further to be distinctly understood that the electric drive also has utility for connecting other types of prime movers to variable torque loads.

The invention is not to be taken as limited to the particular embodiments shown but as will be evident to those skilled in the art, can be considerably modified and is limited only by the scope of the appended claims.

What is desired to be secured by United States Letters Patent is as follows:

1. In a frequency converting system, a source of polyphase alternating electromotive force, a polyphase alternating electromotive force load, a set of electronic control valves for each phase of electromotive force of said supply, each set of said valves having the same number of valves as the phases of said load with one valve of each of said sets being connected to each of the phases of said load, a source of substantially constant potential electromotive force, circuit means connecting said last-named source to said valves, interrupting means interposed in said circuit means for de-energizing the valve of each of said sets of valves connected to the same phase of said load in timed relation to the frequency of said load.

2. In a frequency converting system, a source of polyphase alternating electromotive force, a polyphase alternating electromotive force load, a set of electronic control valves for each phase of electromotive force of said supply, each set of said valves having the same number of valves as the phases of said load with one valve of each of said sets being connected to each of the phases of said load, a source of alternating electromotive force of the same frequency as said source and operable to control said valves, a source of constant potential electromotive force connected to control said valves, circuit interrupting means for connecting said last-named source to the valve of each of said sets of valves connected to the same phase of said load, means for driving said interrupting means at a speed proportional to the frequency of said load, and means for interrupting the control of said valves by said alternating electromotive force source upon rotation of said interrupting means.

3. In a frequency converting system, a source of polyphase alternating electromotive force, a polyphase motor adapted to be driven by said source, a set of electronic control valves for each phase of electromotive force of said supply, each set of said valves having the same number of valves as the phases of said motor with one valve of each of said sets being connected to each of the phases of said motor, a source of constant potential electromotive force, circuit interrupting means, circuit means for connecting said last-named source through said interrupting means to the valve of each of said sets of valves connected to the same phase of said load, and means for driving said interrupting means by said motor.

4. In a frequency converting system, a source of alternating electromotive force, an alternating electromotive force load, an electronic control valve having an anode and a grid and a cathode, circuit means electrically connecting said source to said anode and said cathode to said load, a source of constant potential electromotive force, circuit means connecting said constant potential source to said grid, circuit interrupting means in said last-named circuit means, and means for driving said interrupting means at a speed proportional to the frequency of said load.

5. A vehicle driving mechanism comprising a vehicle chassis having wheels adapted for travel along a surface, a high speed turbine source of prime power adapted to rotate in one direction and journaled within a housing, energy generating means rotated by said source in a direction opposite to said one direction and journaled in a housing to rotate in the plane of rotation of said source, means rigidly connecting said housings together, and motor means for driving at least one of said wheels from said energy generating means.

6. A vehicle driving mechanism comprising a vehicle chassis having wheels adapted for travel along a surface, a high speed turbine source of prime power adapted to rotate in one direction and journaled within a housing and having a certain polar moment of inertia, energy generating means journaled in a housing and having substantially the same polar moment of inertia as the polar moment of inertia of said source and rotated by said source at the same speed as source in a direction opposite to said one direction, means rigidly connecting said housings together, and motor means for driving at least one of said wheels from said energy generating means.

7. A vehicle driving mechanism comprising a vehicle chassis having wheels adapted for travel along a surface, a high speed combustion turbine adapted to rotate in one direction and having a rotor journaled within a housing, an alternator having a rotor rotated by said turbine in a direction opposite to said one direction and journaled in a housing, means rigidly connecting said housings together, a pair of electric motors having rotors geared together to run in opposite directions, and means for driving at least one of said wheels from said motors.

8. A vehicle driving mechanism comprising a vehicle chassis having wheels adapted for travel along a surface, a source of prime power, an alternator driven by said source, an electric motor, a frequency converter, circuit means connecting said alternator to said converter and said converter to said motor for driving said motor by said alternator, and means for driving at least one of said wheels from said motor, and means driven at a speed proportionate to said one wheel and driving means therefor to control the output frequency of said frequency converter.

9. A vehicle driving mechanism comprising a vehicle chassis having wheels adapted for travel along a surface, a source of prime power, an alternator driven by said source, an electric motor, a frequency converter, circuit means connecting said alternator to said converter and said converter to said motor for driving said motor by said alternator, means driven by said motor for controlling said converter, and means for driving at least one of said wheels from said motor.

10. A motor vehicle comprising a vehicle chassis mounted on wheels for movement along a surface, a source of alternating current electric power having an exciting winding and rectifier circuit means connected to said exciting winding for controlling the excitation of said source, an electric motor for driving the vehicle through at least one of said wheels, rectifying means for supplying electric power from said source to said driving motor, automatic means effective to regulate said rectifier circuit means for controlling said source whereby the vehicle may be driven at any desired speed, said speed being dependent upon the energy supplied to said power source, power absorbing means, and means for rendering said source ineffective and said power absorbing means effective to retard rotation of said motor, and including switching elements, different ones of which are operable to disconnect said source exciting winding from said rectifier circuit and place said electric motor in circuit with the latter and to connect said power absorbing means so as to load said motor.

11. In a frequency converting system, a source of alternating electromotive force, a rectifying means coupled to said source, an electric motor coupled to the output of said means, and means actuated by said motor to render said rectifying means conductive to supply a pulsating electromotive force to said motor proportional to the rotative speed of said motor, a pulsating electromotive force supply, circuit means for conducting said pulsating supply to said rectifying means for alternately rendering said rectifying means conductive and non-conductive, and means operable at a predetermined speed of rotation of said motor to render said circuit means ineffective.

12. A motor vehicle comprising a vehicle chassis mounted on wheels for movement along a surface, a source of power having a relatively narrow range of speed change, means for driving the vehicle through at least one of said wheels, infinitely variable speed power transmitting means for supplying power from said power source to said driving means including an electrical generator-motor set, the generator thereof having an energized exciter and an output circuit, and the motor thereof being connected to said generator output circuit to receive load current therefrom, and automatic means controlling said transmitting means for driving the vehicle with a constant horsepower irrespective of vehicle speed and comprising a compensating winding included in said output circuit responsive to motor current and effectively associated with said energized generator exciter to cause the generator output voltage to vary inversely with the magnitude of motor current, the magnitude of said horsepower being dependent solely upon the energy supplied to said power source.

13. In a vehicle propelling system, a source of power, an alternator driven by said source and having an energized wound rotor and field windings, a grid-controlled rectifying means, a wound rotor electric motor operable to drive the vehicle, circuit means connecting the output of said alternator to said rectifying means and said motor to said rectifying means, and circuit means connecting a portion of the windings of said motor to said motor rotor and therethrough to the field windings of said alternator and including a compensating winding operatively associated with the energized wound rotor of the alternator to regulate the energization thereof whereby to make use of the direct current passed by said rectifier to energize said motor rotor.

14. In a vehicle propelling system, a source of rotating prime power, an electric power generating means driven by said source, an electric motor operably connected to drive the vehicle, circuit means connecting the output of said generating means to said motor for drive of said motor by said generating means, an exciter for said generating means driven at a speed proportional to the speed of said generating means, means controlling the output of said exciter, said means being actuated by said motor for controlling said exciter output to said generating means whereby at any given speed the product of the voltage generated by and of the current supply by the generating means is substantially constant value for any given speed of said source irrespective of the speed torque requirements of said motor.

15. In a power transfer combination, an electric power generating means having a flux producing winding, a source of prime power for actuating said generating means, an electric motor, circuit means conducting electric power from said means to said motor, an alternating current-type exciter, a saturating core-type transformer having an input winding and an output winding and a saturating winding, circuit means connecting the alternating current output of said exciter to said input winding, a rectifying circuit connecting said output winding to said flux producing winding, whereby said flux winding is supplied with uni-directional current, and circuit means connecting said saturating winding to said first-named circuit means whereby an increased current flow from said generating means to said motor will cause an increased current flow through said saturating winding.

16. In a power transfer combination, an electric power generating means having a flux producing winding, a source of prime power for actuating said generating means, an electric motor, circuit means conducting electric power from said means to said motor, an alternating current-type exciter, a saturating core-type transformer having an input winding and an output winding and a saturating winding, circuit means connecting the alternating current output of said exciter to said input winding, a rectifying circuit connecting said output winding to said flux producing winding, whereby said flux winding is supplied with uni-directional current, circuit means connecting said saturating winding to said first-named circuit means whereby an increased current flow from said generating means to said motor will cause an increased current flow through said saturating winding, and means for proportioning the increased current flow in said last-named circuit means to said saturating winding whereby said exciter is operable to reduce the flux produced by said flux winding to cause the output voltage of said generating means to be lowered.

17. In a power transfer combination, an electric power generating means having a flux producing winding, a source of prime power for actuating said generating means, an electric motor, circuit means conducting electric power from said means to said motor, an alternating current-type exciter, a saturating core-type transformer having an input winding and an output winding and a saturating winding, circuit means connecting the alternating current output of said exciter to said input winding, a rectifying circuit connecting said output winding to said flux producing winding, whereby said flux winding is supplied with uni-directional current, circuit means connecting said saturating winding to said first-named circuit means whereby an increased current flow from said generating means to said motor will cause an increased current flow through said saturating winding, and means for proportioning the increased current flow in said last-named circuit means to said saturating winding whereby said exciter is operable to reduce the flux produced by said flux winding to cause the output voltage of said generating means to be lowered, said proportioning means acting to lower said voltage in such proportion to the increased current that the product of voltage and current produced by said generating means is maintained substantially constant.

18. In a rectifier circuit, an ionizable electronic valve having a grid and a cathode and an anode, means normally maintaining the potential of said grid slightly negative with respect to the potential of said cathode, means operable to overcome said normally maintaining means to render the potential of said grid positive with respect to the potential of said cathode, and means substantially simultaneously elevating the potential of said cathode to a potential above that of said anode and lowering the potential of said grid to a greatly negative potential with respect to the potential of said cathode before said increase in cathode potential, said last named means comprising a circuit connected to said cathode and an energized grid-controlled tube included in the circuit and operable to impress the firing voltage thereacross upon the cathode, and a potential-applying switching circuit means for changing the potential on said grid and on said grid-controlled tube grid substantially simultaneously in order then to cause said grid-controlled tube to fire.

19. In a rectifier circuit, a pair of ionizable electronic control valves each having a grid and a cathode and an anode, a voltage inducing motor field winding with a center tap provided intermediate the ends thereof, the ends of said winding being connected to said cathodes, a pair of conductors supplying alternating current power, one of said pair of conductors being connected to said anodes, a reactor coil, the other of said pair of conductors being connected through said reactor coil to said center tap, a source of unidirectional potential, a pair of transformers having input and output windings, circuit means connecting said potential source to said input windings, and circuit interrupting means operable to substantially simultaneously impress said potential source across said input windings of one of said transformers and to remove the potential source from said input winding of the other of said transformers, the ends of said output windings of said transformers being respectively positive and negative upon energization of said transformer input coils by said potential source, said one transformer output coil positive terminal being connected to the grid of one of said valves, with said corresponding negative terminal being connected to the cathode of said one valve, said other transformer output coil positive terminal being connected to the grid of the other of said valves with said corresponding negative terminal being connected to the cathode of said other valve.

20. In a rectifier circuit, a pair of ionizable electronic control valves each having a grid and a cathode and an anode, a voltage inducing motor field winding including an intermediate portion provided with a center tap, the ends of said winding being connected to said cathodes, a pair of conductors supplying alternating current power, one of said pair of conductors being connected to said anodes, a reactor coil, the other of said pair of conductors being connected through said reactor coil to said center tap, a source of unidirectional potential, a pair of transformers having input and output windings, circuit means connecting said potential source to said input windings, circuit interrupting means operable to substantially simultaneously impress said potential source across said input windings of one of said transformers and to remove the potential source from said input winding of the other of said transformers, the ends of said output windings of said transformers being respectively positive and negative upon energization of said transformer input coils by said potential source, said one transformer output coil positive terminal being connected to the grid of one of said valves, with said corresponding negative terminal being connected to the cathode of said one valve, said other transformer output coil positive terminal being connected to the grid of the other of said valves with said corresponding negative terminal being connected to the cathode of said other valve, and means for operating said interrupting means in accordance with the frequency of the voltage to be induced by said inducing winding.

21. In a rectifier circuit, a pair of ionizable electronic control valves each having a grid and a cathode and an anode, an electric motor having a rotor and a flux inducing field winding with a center tap provided intermediate the ends thereof, the ends of said winding being connected to said cathodes, a pair of conductors supplying alternating current power, one of said pair of conductors being connected to said anodes, a reactor coil, the other of said pair of conductors being connected through said rotor and said reactor coil to said center tap, a source of unidirectional potential, a pair of transformers having input and output windings, circuit means connecting said potential source to said input windings, a rotary circuit interrupting means operable to substantially simultaneously impress said potential source across said input windings of one of said transformers and to remove the potential source from said input winding of the other of said transformers, the ends of said output windings of said transformers being respectively positive and negative upon energization of said transformer input coils by said potential source, said one transformer output coil positive terminal being connected to the grid of one of said valves, with said corresponding negative terminal being connected to the cathode of said one valve, said other transformer output coil positive terminal being connected to the grid of the other of said valves with said corresponding negative terminal being connected to the cathode of said other valve, and means for rotating said interrupting means proportionally to the motor speed.

22. In a rectifier circuit, an ionizable electronic control valve having a grid and a cathode and an anode, a voltage-inducing winding connected to receive current from said cathode, a pair of conductors supplying alternating current power, one of said pair of conductors being connected to said anode, the other of said pair of conductors being connected to said winding, means normally maintaining the potential of said grid slightly negative with respect to the potential of said cathode, means operable to overcome said normally maintaining means to render the potential of said grid positive with respect to the potential of said cathode, and means substantially simultaneously elevating the potential of said cathode to a potential above that of said anode and lowering the potential of said grid to a greatly negative potential with respect to the potential of said cathode prior to said increase in cathode potential, said last named means comprising a circuit connected to said cathode through said winding and an energized grid-controlled tube included in said circuit and operable to impress the firing voltage thereof transiently across the winding and upon the cathode, and a voltage-applying switching circuit means for changing the potential of said grid and said grid-controlled tube grid substantially simultaneously in order then to cause said grid-controlled tube to fire.

23. The combination of claim 22 in which said last-named means includes a reactor coil interposed in the other of said pair of conductors and said inducing winding forms a part of an electric motor.

24. In a rectifying circuit, a pair of ionizable electronic control valves, each said valve having a grid and a cathode and an anode, a center-tapped voltage-inducing motor phase winding having a center tap intermediate the ends thereof, a first conductor connecting the cathode of one of said valves to one end of said winding, a second conductor connecting the cathode of the other of said valves to the other end of said winding, a pair of conductors for supplying alternating current, one of said pair of conductors being connected to each of said anodes, the other of said pair of conductors being connected to the center tap of said winding, means normally maintaining the potential of each of said grids slightly negative with respect to the potential of its respective cathode, means operable to overcome said normally maintaining means to render selectively the potential of said grids positive with respect to their cathode, and means substantially simultaneously and selectively elevating the potential of said cathodes to a potential above that of their respective anodes and selectively lowering the potential of said grids to a greatly negative potential with respect to the potential of their cathodes prior to said increase in their respective cathode potential.

25. The combination of claim 24 in which overcoming means and said potential elevating means act alternately, and in which said elevating means includes a reactor coil connected between said center tap and said other conductor.

26. In an electrical network, a source of alternating current electrical energy having a pair of output conductors, means controlling the output voltage of said conductors and having a control winding, an ionizable electronic control valve having a grid and a cathode and an anode, a voltage-inducing winding connected to receive current from said cathode, one of said pair of conductors being connected to said anode, the other of said pair of conductors being connected through said control winding to said inducing winding whereby current proportional to the current flow through said inducing winding will flow through said control winding, said controlling means being operable to control the voltage of said source inversely to the current flow through said control winding whereby the product of the voltage of said source and the current delivered by said source remains substantially constant, means normally maintaining the potential of said grid slightly negative with respect to the potential of said cathode, means operable to overcome said normally maintaining means to render the potential of said grid positive with respect to the potential of said cathode, and means substantially simultaneously elevating the potential of said cathode to a potential above that of said anode and lowering the potential of said grid to a greatly negative potential with respect to the potential of said cathode prior to said increase in cathode potential, said last named means comprising a circuit connected to said cathode through said winding and an energized grid-controlled control valve included in said circuit and operable to impress the firing voltage thereof transiently across the winding and upon said cathode, and a voltage applying switching circuit means for changing the potential of said ionizable electronic control valve grid and said energized grid-controlled control valve grid substantially simultaneously in order then to cause said grid-controlled tube to fire.

27. The combination of claim 26 in which a gas turbine supplies the energy for said source and in which said inducing winding forms a part of an induction motor having a wound rotor arranged in series circuit therewith, said induction motor being arranged to drive a load of variable torque.

28. The combination of claim 27 in which a pair of inducing windings and a pair of control valves are utilized, said valve anodes being connected together, said inducing windings each having one terminal thereof connected to said other conductor, the other terminals of said windings being connected one to the cathode of one of said valves and the other to the cathode of the other of said valves, said normally maintaining means being operable to act on both of said grids, said overcoming means being operable alternately on said valves, and said elevating means acting on one of said valves substantially concurrently with the actuation of said overcoming means on the other of said valves.

29. The combination of claim 28 in which said elevating means includes a reactor coil in series with said other conductor.

30. In a motor vehicle, a wheel adapted to propel the vehicle, a gas turbine rotatable in one direction, an alternator rotatable by said turbine in a direction opposite to said one direction and having a pair of output conductors and an exciting field winding, an alternating current exciter driven at a speed proportional to that of said alternator and having output conductors, a saturable core transformer having a primary winding and a secondary winding and a saturating winding, said primary winding being connected between said exciter output conductors, said secondary winding being connected to energize said exciting winding, an electric motor having a flux-inducing stator winding with a center tap connection intermediate the ends thereof, and having a rotor, means connecting said rotor for rotation of said wheel whereby the vehicle is propelled, a pair of electric valves, each said valve having an anode and a cathode and a grid, said anodes being connected to one of said alternator output conductors, the center tap connection of said flux-inducing winding being connected through said rotor and said saturating winding to the other of said alternator output conductors whereby the degree of presaturation of said transformer is proportional to the current output of said alternator so that the energization of said field winding is inversely proportional to said alternator output current whereby the energy output of said alternator is held substantially constant for a given turbine speed, means normally maintaining the potential of each of said grids negative with respect to the potential of its respective cathode, means actuated in accordance with the speed of rotation of said wheel for alternately rendering the potential of said grids positive with respect to its respective cathode, and means substantially simultaneously elevating the potential of the cathode of one of said valves to a potential above that of its respective anode and lowering the potential of the grid of said one valve to a greatly negative potential with respect to the potential of the cathode of said one valve prior to said increase in potential of the cathode of said one valve subsequent to the rendering of the grid of the other of said valves positive with respect to its respective cathode by said second-last-named means.

31. In a motor vehicle, a wheel adapted to propel the vehicle, a gas turbine rotatable in one direction, a polyphase alternator rotatable by said turbine in a direction opposite to said one direction and having output conductors and an exciting field winding, an alternating current exciter driven at a speed proportional to that of said alternator and having output conductors, a saturable core transformer having a primary winding and a secondary winding and a saturating winding, said primary winding being connected between said exciter output conductors, said secondary winding being connected to energize said exciting winding, a polyphase synchronous-type electric motor, means connecting said motor for rotation of said wheel whereby the vehicle is propelled, a set of electric rectifier valves for each phase of said alternator, each of said sets of valves having the same number of valves as the phases of said load with one valve of each of said sets being connected to each of the phases of said load for supplying rectified power thereto, a source of substantially constant potential electromotive force, circuit means connecting said last-named source to said valves, interrupting means interposed in said circuit means for de-energizing the valve of each of said sets of valves connected to the same phase of said motor in timed relation to the speed of rotation of said motor whereby the frequency of the rectified power is proportional to the speed of the vehicle, means connecting said saturating winding in circuit with said alternator and said motor whereby current flow through said saturating winding is proportioned to the output current of said alternator whereby said transformer is presaturated proportionally to the output current of said alternator to control the current flow through said exciting field winding so that for any given speed of said turbine said alternator will have a predetermined substantially constant power output.

32. A motor vehicle comprising a vehicle chassis mounted on wheels for movement along a surface, a source of excited alternating current electric power having an exciting winding and energized rectifier circuit means connected to said source exciting winding for controlling the excitation of said source, an electric motor for driving the vehicle through at least one of said wheels, rectifying means for supplying electric power from said source to said driving motor, automatic means effective to regulate the energization of said rectifier circuit means for controlling said source whereby the vehicle may be driven at any desired speed, said speed being dependent upon the energy supplied to said power source, power-absorbing means, and means for rendering said source ineffective and said power-absorbing means effective to retard rotation of said motor, and including switching elements, different ones of which are operable to disconnect said source exciting winding from the said rectifier circuit and place said electric motor in circuit with the latter and to connect said power absorbing means so as to load said motor.

33. A motor vehicle comprising a source of excited alternating current electric power having an exciting winding and rectifier circuit means connected to said source exciting winding for controlling the excitation of said source, a wound-rotor electric motor for driving the vehicle, rectifying means for supplying electric power from said source to said driving motor, automatic means effective to regulate the energization of said rectifier circuit means for controlling said source whereby the vehicle may be driven at any desired speed, said speed being dependent upon the energy supplied to said power source, power absorbing means, and means for rendering said source ineffective and said power-absorbing means effective to retard rotation of said motor, and including switching elements operable to disconnect said source exciting winding from the said rectifier circuit and place said electric motor wound rotor in said rectifier circuit and to connect said power-absorbing means so as to load said motor.

34. A propulsion system for a vehicle mounted on wheels for movement along a surface, comprising an excited source of prime-mover-driven electric power comprising first electrical machine means and an exciter winding circuit therefor and an exciter winding included therein for controlling the excitation of said source, second electrical machine means, circuit connections for each electrical machine means, means including load circuit means interconnecting said machine circuit connections for conducting electrical output from the first machine means and being effective to transmit the first machine output to the second machine for electrically driving the latter, said second machine means being provided with gear-carrying rotor shafting for transmitting mechanical torque drive and being adapted to deliver torque to a propeller shaft for driving the vehicle through at least one of said wheels, means effective to regulate the energization of said source exciter winding for controlling said source whereby the vehicle may be driven at any desired speed, said speed being dependent upon the torque supplied to said power source by the prime mover, said last named means including electrical coupling means between the load circuit in the machine circuit interconnection means and the exciter winding circuit aforesaid and effective to vary the energization of said exciter winding and said source in inverse interdependence upon magnitude of a load power characteristic, dynamic braking means including electrical power absorbing means, and electrical switching elements for disconnecting circuits to said first and second machines one from the other and placing the electrical power absorbing means in one of the thus-disconnected circuits for dynamically braking the included electrical machine means.

35. A prime-mover propulsion system for a vehicle mounted on wheels for movement along a surface and having a pair of pedal-operated controls consisting of a throttle control and a friction brake control, comprising an excited source of prime-mover-driven electric power comprising first electrical machine means and an exciter winding circuit therefor and an exciter winding included therein for controlling the excitation of said source, second electrical machine means, circuit connections for each electrical machine means, means including load circuit means interconnecting said machine circuit connections for conducting electrical output from the first machine means and being effective to transmit the first machine output to the second machine for electrically driving the latter, said second machine means being provided with gear-carrying rotor shafting for transmitting mechanical torque drive and being adapted to deliver torque to a propeller shaft for driving the vehicle through at least one of said wheels, means effective to energize said source exciter winding for controlling said source whereby the vehicle may be driven at any desired speed, said speed being dependent upon the torque supplied to said power source by the prime mover, dynamic braking means including electrical power absorbing means, and electrical switching elements for disconnecting circuits to said first and second machines one from the other and placing the electrical power absorbing means in one of the thus-disconnected circuits for effectively dynamically braking the included electrical machine means, and a switch-actuating member operatively connected to one of said pedal-operated pair of controls and to at least one of said switching elements to actuate the latter in response to operation of said one pedal-operated control.

PAUL T. NIMS.

REFERENCES CITED

The following references are of record in the file of this patent:

UNITED STATES PATENTS

| Number | Name | Date |
|---|---|---|
| 659,729 | Eaton | Oct. 16, 1900 |
| 745,157 | Coleman | Nov. 24, 1903 |
| 1,098,345 | Durtnall | May 26, 1914 |
| 1,111,510 | Ward | Sept. 22, 1914 |
| 1,115,948 | Lord | Nov. 3, 1914 |
| 1,217,702 | Bulley | Feb. 27, 1917 |
| 1,598,268 | De Coninck | Aug. 31, 1926 |
| 1,606,547 | Ward | Nov. 9, 1926 |
| 1,702,402 | Hazeltine | Feb. 19, 1929 |
| 1,934,230 | Jonas | Nov. 7, 1933 |
| 1,937,361 | Sabbah et al. | Nov. 28, 1933 |
| 1,960,217 | Unger | May 22, 1934 |
| 1,971,840 | Willis | Aug. 28, 1934 |
| 2,151,753 | Etzrodt | Mar. 28, 1939 |
| 2,175,547 | Journeaux | Oct. 10, 1939 |
| 2,175,920 | Schnarz | Oct. 10, 1939 |
| 2,196,064 | Erban | Apr. 2, 1940 |
| 2,202,711 | Morack | May 28, 1940 |
| 2,220,118 | Overbeck | Nov. 5, 1940 |
| 2,264,854 | Mittag | Dec. 2, 1941 |

FOREIGN PATENTS

| Number | Country | Date |
|---|---|---|
| 108,970 | Great Britain | Aug. 30, 1917 |